US010723242B2

(12) United States Patent
De Rico Herrero et al.

(10) Patent No.: US 10,723,242 B2
(45) Date of Patent: Jul. 28, 2020

(54) DISMOUNTABLE SEAT

(71) Applicant: INNOVATION & SAFETY, S.L., Madrid (ES)

(72) Inventors: Sergio De Rico Herrero, Madrid (ES); Glecia Nogueira Da Silva, Madrid (ES)

(73) Assignee: INNOVATION & SAFETY, S.L., Madrid (ES)

( * ) Notice: Subject to any disclaimer, the term of this patent is extended or adjusted under 35 U.S.C. 154(b) by 0 days.

(21) Appl. No.: 16/081,345

(22) PCT Filed: Dec. 9, 2016

(86) PCT No.: PCT/EP2016/080521
§ 371 (c)(1),
(2) Date: Aug. 30, 2018

(87) PCT Pub. No.: WO2017/153013
PCT Pub. Date: Sep. 14, 2017

(65) Prior Publication Data
US 2018/0370387 A1   Dec. 27, 2018

(30) Foreign Application Priority Data

Mar. 7, 2016   (EP) ..................................... 16382102

(51) Int. Cl.
*B60N 2/015*   (2006.01)
*B60N 2/02*    (2006.01)
(Continued)

(52) U.S. Cl.
CPC ..... *B60N 2/01583* (2013.01); *B60N 2/01508* (2013.01); *B60N 2/01516* (2013.01);
(Continued)

(58) Field of Classification Search
CPC ............ B60N 2/01508; B60N 2/01583; B60N 2/01516; B60N 2002/684; B60N 2/0276; B60R 2021/0027
(Continued)

(56) References Cited

U.S. PATENT DOCUMENTS

| 4,836,597 | A | | 6/1989 | Izumida |
| 5,152,571 | A | * | 10/1992 | Kohler .................. B60N 2/005 248/503.1 |

(Continued)

FOREIGN PATENT DOCUMENTS

| DE | 102004014879 A1 | 10/2005 |
| WO | 2007147908 A1 | 12/2007 |

OTHER PUBLICATIONS

International Search Report dated Feb. 24, 2017 re: Application No. PCT/EP2016/080521, pp. 1-5, citing: US 2007/057563 A1, WO 2007/147908 A1, U.S. Pat. No. 4,836,597 A, U.S. Pat. No. 5,183,314 A and DE 10 2004 014879 A1.

(Continued)

*Primary Examiner* — Jason S Morrow
(74) *Attorney, Agent, or Firm* — Cantor Colburn LLP

(57) ABSTRACT

A dismountable seat assembly for attaching to an anchoring component of a vehicle includes an individual back hingeably attached to an individual seat, an attaching component and an emergency connecting component. The emergency connecting component connects at least a part of the individual seat which is attached to the individual back to the attaching component in a detachable way, so that the individual back and the at least part of the individual seat attached to the individual back are detachable together from the attaching component.

10 Claims, 7 Drawing Sheets

(51) Int. Cl.
*B60N 2/68* (2006.01)
*B60R 21/00* (2006.01)

(52) U.S. Cl.
CPC ...... *B60N 2/0276* (2013.01); *B60N 2002/684* (2013.01); *B60R 2021/0027* (2013.01)

(58) Field of Classification Search
USPC .............................................. 296/68.1, 65.03
See application file for complete search history.

(56) References Cited

U.S. PATENT DOCUMENTS

| | | | |
|---|---|---|---|
| 5,183,314 A | 2/1993 | Lorbiecki | |
| 5,697,662 A * | 12/1997 | Leftwich | B60N 2/01583 248/503.1 |
| 6,244,649 B1 * | 6/2001 | Scheck | B60N 2/01583 248/503.1 |
| 2007/0057563 A1 * | 3/2007 | Taguchi | B60N 2/01508 297/463.1 |
| 2009/0114794 A1 * | 5/2009 | Rudduck | B60N 2/015 248/503.1 |
| 2009/0146478 A1 * | 6/2009 | Sakamoto | B60N 2/2231 297/362.14 |
| 2010/0001545 A1 * | 1/2010 | De Rico Herrero | B60N 2/01575 296/65.03 |
| 2010/0283301 A1 * | 11/2010 | Shanmugam | B60N 2/12 297/344.1 |
| 2017/0259705 A1 * | 9/2017 | Supernavage | B60N 2/0715 |

OTHER PUBLICATIONS

Written Opinion dated Feb. 24, 2017 re: Application No. PCT/EP20161080521, pp. 1-6, citing: US 2007/057563 A1 and WO 2007/147908 A1.

* cited by examiner

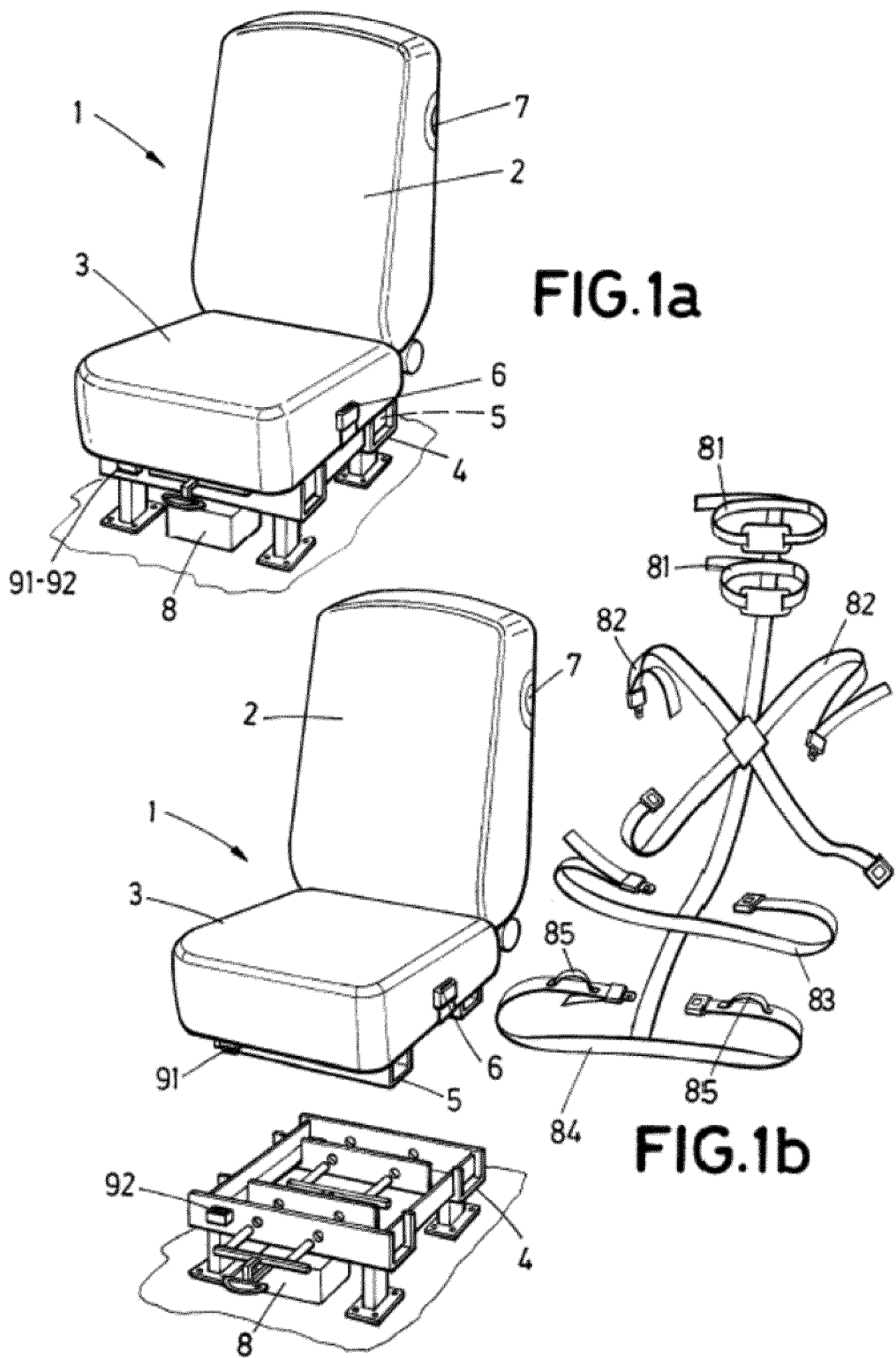

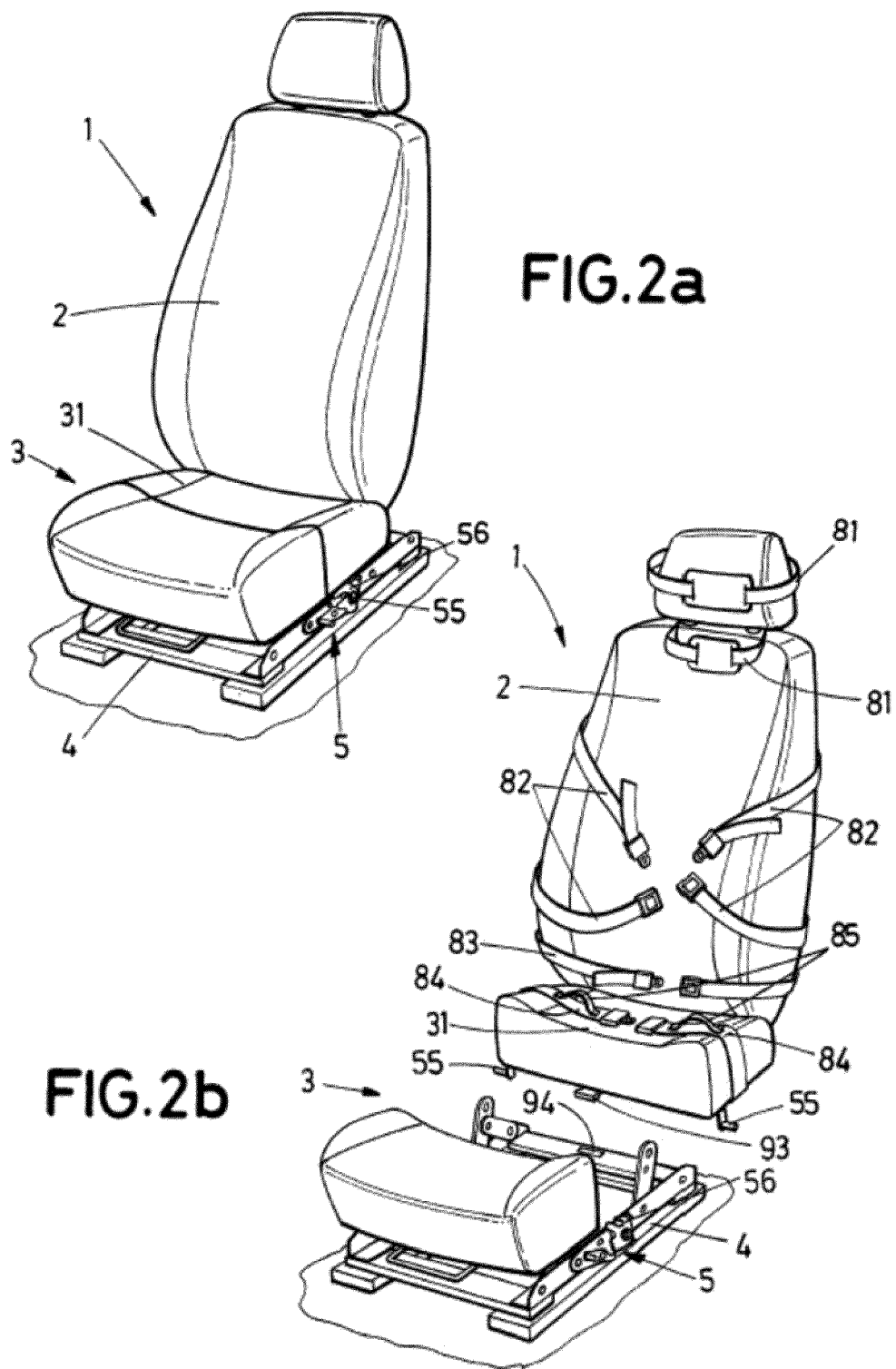

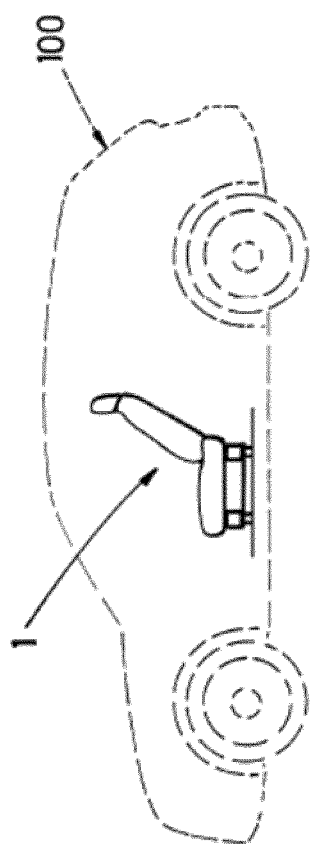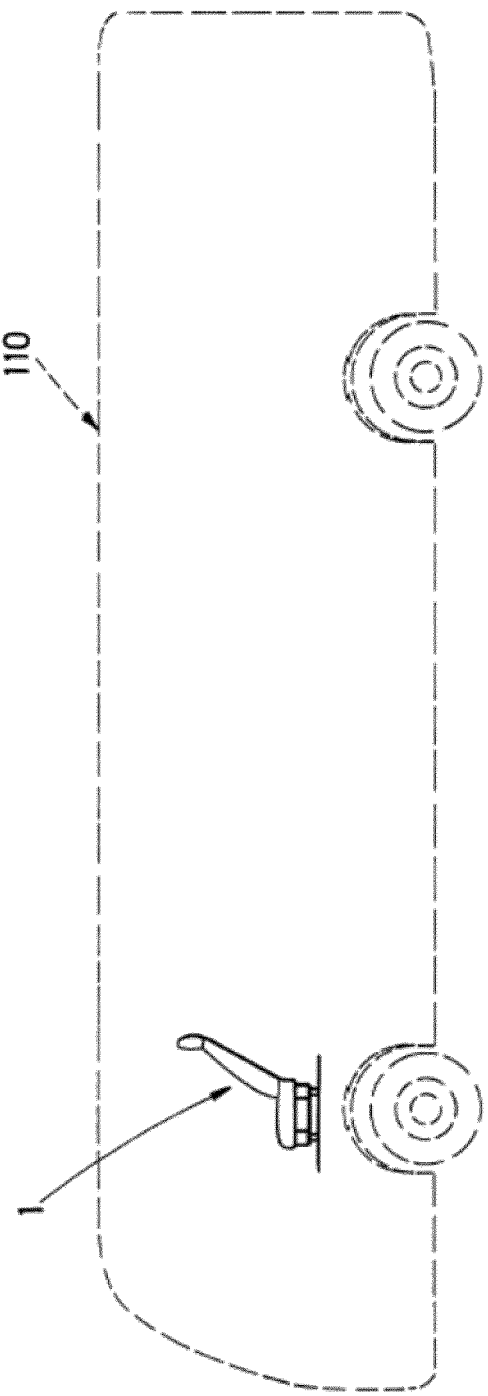

DISMOUNTABLE SEAT

TECHNICAL FIELD

This disclosure belongs to the field of safety devices for rescuing injured people resulting from an accident.

BACKGROUND

People who result injured in road accidents usually need to be evacuated from vehicles trying to keep the "head-neck-column" axis as secure as possible. Several devices have been disclosed in order to achieve this configuration.

Document WO 2007/147908 A1 discloses one of these devices. In this document, a dismountable seat is disclosed, comprising means for uncoupling the back from the seat of such a device. The injured person may be thus extracted from the vehicle keeping the back held to the back of the seat, while keeping the seat in the vehicle. The injured person may be secured using straps which may be connected to the extracted back of the seat assembly.

Other similar devices are disclosed in different patent applications, such as DE 102004014879 A1.

These devices provide for a way of moving the injured person together with the seat back off the vehicle and lay the assembly on a stretcher. However, while positioning said assembly on the stretcher, the buttocks and legs of the patient are placed at a different level. Cushions or additional mattresses are usually used to level the buttocks and legs of the patient.

SUMMARY

These problem is solved in an alternative way by a dismountable seat according to claim 1. Preferred embodiments of the disclosure are defined in dependent claims.

In a first aspect, the disclosure provides a dismountable seat assembly for being attached to anchoring means of a vehicle, the seat assembly comprising
an individual back and an individual seat, attached together;
attaching means, suitable for attaching the seat assembly to the anchoring means of the vehicle;
emergency connecting means, connecting at least a part of the individual seat which is attached to the individual back to the attaching means in a detachable way, so that the individual back and the at least part of the individual seat attached to the individual back are detachable together from the attaching means.

This dismountable seat is provided for being used in any type of vehicle, either in collective ones, such as buses, or in particular ones, such as cars, vans or trucks.

This dismountable seat is aimed to provide an easy way for emergency assistance in a road accident to remove a person from the interior of a vehicle, the person being placed in the part of this dismountable seat which is intended to be removed together with the person.

This part of the dismountable seat comprises the individual back and at least part of the individual seat. Advantageously, this device provides for means to keep the buttocks and part of the legs of the injured person in a position which can be easily managed by the emergency assistance services.

This dismountable seat can also be completely extracted from the vehicle, due to modularity operations, such as the seat configuration in a bus or in a van. But the disclosure is not intended to improve modularity options, but to provide a way of rescuing a person from a vehicle together with a portion of the seat assembly. To achieve this aim, only part of the individual seat and the individual back needs to be extracted. This part of the individual seat that needs to be extracted is the part of the individual seat corresponding to the buttocks of a person sit on this seat assembly. Hence, this part of the individual seat which is to be extracted is attached to the individual back. However, the whole length of the seat may be extracted with the back.

Despite the fact that it is enough for the disclosure that only a part of the individual seat is extracted together with the individual back, in a particular embodiment, the at least part of the individual seat attached to the individual back is the whole individual seat, so the individual seat and the individual back are extracted together.

However, even in this case, the attaching means remain fixed to the anchoring means of the vehicle, not being adapted to be removed with the individual back and the part of the individual seat which is attached to the emergency connecting means. The attaching means may include the regulation guides for displacing the seat assembly back and forth, the regulation systems to displace the seat assembly up and down, any heat conditioning means or massaging means, any airbag connections or other electrical/electronical connections.

In a particular embodiment, the individual back and the individual seat are hingeably attached together with a hingeable attachment. In this case, the hingeable attachment comprises blocking means suitable for keeping constant the relative inclination between the individual seat and the individual back. This is useful when the at least part of the individual seat and the individual back have been extracted, so that the assembly may hold the person properly.

In a particular embodiment, the dismountable seat assembly further comprises hiding means, arranged in the seat assembly covering the emergency connecting means in order to keep them hidden from accidental operation.

This hiding means may be easily overcome by the emergency assistance services, for a quick operation of the emergency connection means.

In a particular embodiment, the emergency connecting means comprise a one-use-only frangible part.

To ease the operation of the emergency connecting means, this may be a one use only frangible part, so that they are activated by a particular movement of the seat assembly or just applying a force enough to break this part.

In a particular embodiment, the emergency connecting means comprise at least one bolt passing through a hole, the at least one bolt being removable, in such a way that a removal of the bolt causes the detachment of the individual back and the at least part of the individual seat attached to the individual back.

In a particular embodiment, another option to configure the emergency connection means is provided, which is to provide a removable bolt, in such a way that when removing said bolt, the individual back and the part of the individual seat which is to be removed are released and may be extracted without applying any additional force.

In a particular embodiment, the dismountable seat assembly further comprises a detachable electrical and/or electronical connection between the part of the individual seat connected to the attaching means and the attaching means. This connection is useful because when extracting the individual back and the part of the individual seat which is to be extracted, electrical connections, if any, should be disconnected in an easy and safe way. In particular embodiments, this detachable electrical and/or electronical connection comprise plug-socket means, magnetic means or just contact-by pressure means.

In a particular embodiment, the dismountable seat assembly further comprises a seat belt assembly attached to the individual back and/or to the part of the individual seat attached to the individual back.

This embodiment makes the extraction even easier. If the seat belt assembly is attached to the seat assembly, there is no need for the emergency assistance services to un fasten the seat belt before the person is extracted, because the individual back and the part of the individual seat which is to be extracted may be removed together with the seat belt, thus providing further securing for the person, and avoiding unnecessary actions.

In a particular embodiment, the dismountable seat assembly further comprises handling means, for handling the individual back and/or the part of the individual seat connected to the attaching means by means of the emergency connecting means.

In a particular embodiment, the attaching means comprises regulation means to regulate the relative position of the seat assembly with respect to the guiding means.

In a particular embodiment, the dismountable seat assembly further comprises a plurality of straps for securing a person against the individual back and the at least part of the individual seat attached to the individual back.

In different embodiments, these straps are located in the rear part of the individual back, in the lateral part of the individual back, in the lateral part of the individual seat or behind the individual seat. In different embodiments, they are located together or distributed among some of the places abovementioned. In different embodiments, they are attached to the individual back and/or to the individual seat.

In a second aspect, the disclosure provides an emergency system comprising a dismountable seat assembly according to the first aspect and a securing kit comprising a plurality of straps for securing a person against the individual back and the at least part of the individual seat attached to the individual back.

The aim of this emergency system is providing a way of carrying out the disclosure which is adapted to vehicles which offers the possibility of placing the straps in a place which is separated from the seat assembly.

In a particular embodiment, the securing kit further comprises a cervical collar.

In a particular embodiment, one point of each strap are attached together in a common point, thus providing an easy way of arranging the straps around the person.

This way of arranging the straps allows them being managed from one common point which, if fixed, allow placing each strap individually but with the reference provided by the common point.

In a particular embodiment, at least two straps are intended to secure the head of the person, at least two straps are intended to secure a chest zone of the person, and at least one strap is intended to secure the legs of the person. In a further particular embodiment, at least two straps intended to secure the chest zone of the person are attached together in a predetermined way in order to be more easily installable around the chest zone of the person. These ways of arranging the straps are advantageous for the emergency assistance services.

In a particular embodiment, at least one strap comprises a colours code, to be easily recognizable.

In a particular embodiment, at least one strap comprises secondary handling means. This strap provides further advantageous means for the handling of the assembly formed by the injured person, the individual back and the part of the individual seat which is to be extracted.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out. The drawings comprise the following figures:

FIG. 1a shows a particular embodiment of a dismountable seat assembly according to the disclosure being attached to anchoring means of a vehicle;

FIG. 1b shows the particular embodiment of FIG. 1a, but after operating the emergency connecting means;

FIG. 2a shows a particular embodiment of a dismountable seat assembly according to the disclosure being attached to anchoring means of a vehicle;

FIG. 2b shows the particular embodiment of FIG. 2a, but after operating the emergency connecting means;

FIGS. 5a and 5b show vehicles comprising a seat assembly according to the disclosure.

DETAILED DESCRIPTION OF THE DRAWINGS

Figure 1C:
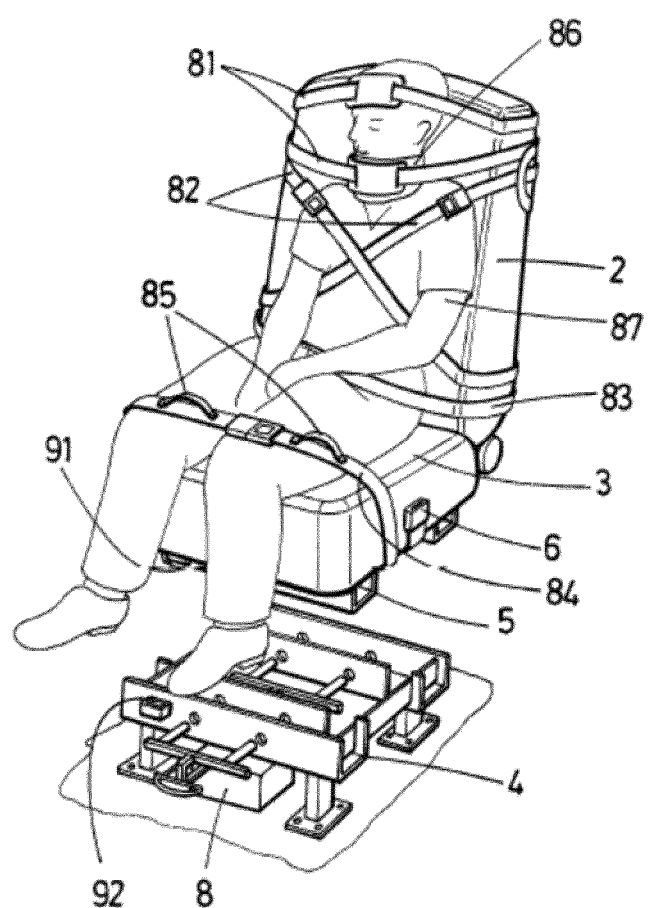
FIG. 1c shows the particular embodiment of FIG. 1a, after operating the emergency connecting means with a person sit on the seat assembly.

FIG. 1a shows a particular embodiment of a dismountable seat assembly (1) according to the disclosure being attached to anchoring means of a vehicle.

This seat assembly (1) comprises
an individual back (2) and an individual seat (3), hingeably attached together;
attaching means (4), suitable for attaching the seat assembly (1) to the anchoring means of the vehicle;
emergency connecting means (5), connecting the individual seat (3) to the attaching means (4) in a detachable way, so that the individual back (2) and the individual seat (3) are detachable together from the attaching means (4).

In this particular embodiment, the whole individual seat (3) is attached to the attaching means (4) in a detachable way, although in other embodiments, it is only a part of the individual seat (3) which is attached to the attaching means (4).

In this particular figure, the dismountable seat (1) is provided for being used in a bus. The bus comprises anchoring means, which are intended to receive the attaching means (4) of the dismountable seat (1) when the seat arrangement is configured. Conventional anchoring means and conventional attaching means (4) are used in this disclosure. In this case, the complete dismountable seat assembly (1) may be extracted and repositioned in a different place, due to modularity operations.

In this figure, the emergency connecting means (5) comprise a plurality of bolts (50), which are inserted in circular holes (51) comprised both in the attaching means (4) and in the individual seat (3). These emergency connecting means (5) used in the embodiment of this figure are described in more detail in FIGS. 3a and 3b.

However, it is also part of the disclosure the combination of any other emergency connecting means (5) which serve for this purpose of releasing the individual seat (3) together with the individual back (2) and the injured person.

In some embodiments of the disclosure, the emergency connecting means (5) are under a cover, in order to keep them hidden from accidental operation. This cover is easily removed by the emergency assistance services for a quick operation of the emergency connection means (5).

FIG. 1b show the seat assembly (1) of FIG. 1a after operating the emergency connection means (5).

As may be seen in FIG. 1b the attaching means (4) remain fixed to the anchoring means of the vehicle, not being adapted to be removed with the individual back (2) and the individual seat (3). The attaching means (4) include in this case an electrical connection for the use of headphones and a LCD display located in the backside of the individual back (2). This electrical connection comprises a plug-socket connection (91, 92), so that when the individual back (2) and the individual seat (3) are removed, the plug-socket connection (91, 92) unplugs, the plug (91) being removed with the individual back (2) and the individual seat (3) and the socket (92) remaining in the attaching means (4).

In the embodiment shown in this figure, the dismountable seat assembly (1) further comprises a seat belt assembly (6) attached to the individual back (2) and to the individual seat (3).

This embodiment makes the extraction of the individual seat (3) with the individual back (2) even easier. As the seat belt assembly (6) is attached to the seat assembly, there is no need for the emergency assistance services to unfasten the seat belt before the person is extracted, and it provides the person with further safety.

This dismountable seat assembly (1) further comprises handling means (7), for handling the individual back (2). In this case, the individual seat (3) may be handled directly, without handling means, just putting the hands under the individual seat (3) while being lifted.

FIGS. 1a and 1b also show a securing kit (8) comprising a plurality of straps (81, 82, 83, 84) for securing a person against the individual back (2) and the individual seat (3).

FIG. 1a shows the securing kit (8) before an emergency occurs. In this case, the securing kit (8) is located apart from the seat assembly (1). They can be placed above the person or in any other suitable place, which is easily accessible by the emergency assistance services.

At least two straps (81) are intended to secure the head of the person, at least two straps (82) are intended to secure a chest zone of the person, at least one strap (83) is intended to secure the abdomen of the person and at least one strap (84) is intended to secure the legs of the person. The security kit (8) further comprises a cervical collar (86). In a further particular embodiment, at least two straps (82) intended to secure the chest zone of the person are attached together in a predetermined way in order to be more easily installable around the chest zone of the person. These ways of arranging the straps are advantageous for the emergency assistance services.

As may be seen in FIG. 1b, one point of each strap (81, 82, 83, 84) are attached together in a common point, thus providing an easy way of arranging the straps (81, 82, 83, 84) around the person. Further, the strap (84) intended to secure the legs of the person comprises secondary handling means (85), thus providing further advantageous means for the handling of the assembly formed by the injured person, the individual back and the part of the individual seat which is to be extracted.

FIG. 1c shows the seat assembly of FIG. 1b with a person (87) sit on the seat assembly (1). This person (87) wears the straps (81, 82, 83, 84) and the cervical collar (86).

FIG. 2a shows another particular embodiment of a dismountable seat assembly (1) according to the disclosure being attached to anchoring means of a vehicle.

This seat assembly (1) comprises
an individual back (2) and an individual seat (3), hingeably attached together;
attaching means (4), suitable for attaching the seat assembly (1) to the anchoring means of the vehicle;
emergency connecting means (5), connecting a first part (31) of the individual seat (3) to the attaching means (4) in a detachable way, so that the individual back (2) and the first part (31) of the individual seat (3) are detachable together from the attaching means (4).

The first part (31) of the individual seat (3) is a part of the individual seat (3) which is hingeably attached to the individual back (2), as both the first part (31) of the individual seat (3) and the individual back (2) are extracted together when operating the emergency connecting means (5). The aim of this first part (31) of the individual seat (3) is providing support for the buttocks of a person sit on the seat assembly (1), so it is enough that just a part of the individual seat (3), such this first part (31) is extracted with the individual back (2). In this particular embodiment, the rest of the individual seat (3) remains attached to the attaching means (4).

In this figure, the dismountable seat (1) is provided for being used in a car. The car comprises anchoring means, which are intended to receive the attaching means (4) of the dismountable seat (1) when the seat arrangement is configured. Conventional anchoring means and conventional attaching means (4) are used in this disclosure. In this case, the complete dismountable seat (1) may be displaced along the rails comprised in the anchoring means, to achieve an optimum driver's position.

In this figure, the emergency connecting means (5) comprise a plurality of known fastening devices, each one being of the type of those comprising a bolt (55) intended to be introduced in a pivotable slot (56). These emergency connecting means are described in more detail in FIGS. 4a and 4b.

However, it is also part of the disclosure the combination of any other emergency connecting means (5) which serve for this purpose of releasing the first part (31) of the individual seat (3) together with the individual back (2) and the injured person.

In this figure, it can be seen how the emergency connecting means (5) are hidden by the individual seat (3) itself, in order to keep them hidden from accidental operation. However, the emergency connecting means (5) are easily accessible by the emergency assistance services, who know where they are.

FIG. 2b show the seat assembly (1) of FIG. 2a after operating the emergency connection means (5).

As may be seen in FIG. 2b the attaching means (4) remain fixed to the anchoring means of the vehicle, not being adapted to be removed with the individual back (2) and the first part (31) of the individual seat (3). The rest of the individual seat (3) is kept connected to the attaching means (4).

The attaching means (4) include in this case an electrical connection for the seat heating and a LCD display located in the backside of the individual back (2). This electrical connection comprises a simple connection by pressure of a first electrical part (93) over a second electrical part (94), so that when the individual back (2) and the first part (31) of the individual seat (3) are removed, as the pressure due to the attachment itself is removed, electrical connection just disappears. These kind of connections are already known, and any other electrical connection of this type could also be used in this particular embodiment of the disclosure.

In the embodiment shown in this figure, the dismountable seat assembly (1) further comprises a seat belt assembly (6) attached to the individual back (2) and to the individual seat (3).

This embodiment makes the extraction of the individual seat (3) with the individual back (2) even easier. As the seat belt assembly (6) is attached to the seat assembly, there is no need for the emergency assistance services to unfasten the seat belt before the person is extracted, and it provides the person with further safety.

FIGS. 2a and 2b also show a plurality of straps (81, 82, 83, 84) for securing a person against the individual back (2) and the first part (31) of the individual seat (3).

FIG. 2a shows the straps (81, 82, 83, 84) before an emergency occurs. In this case, the securing kit is located in the individual back (2), covered by a lid.

At least two straps (81) are intended to secure the head of the person, at least two straps (82) are intended to secure a chest zone of the person, at least a strap (83) is intended to secure the abdomen of the person and at least one straps (84) is intended to secure the legs of the person. The securing kit (8) further comprises a cervical collar (86). In a further particular embodiment, at least two straps (82) intended to secure the chest zone of the person are attached together in a predetermined way in order to be more easily installable around the chest zone of the person. These ways of arranging the straps are advantageous for the emergency assistance services.

As may be seen in FIG. 2b, one point of each strap are attached together in a common point, thus providing an easy way of arranging the straps around the person. Further, the straps (84) intended to secure the legs of the person comprise secondary handling means, thus providing further advantageous means for the handling of the assembly formed by the injured person, the individual back and the part of the individual seat (3) which is to be extracted.

Figure 2C:
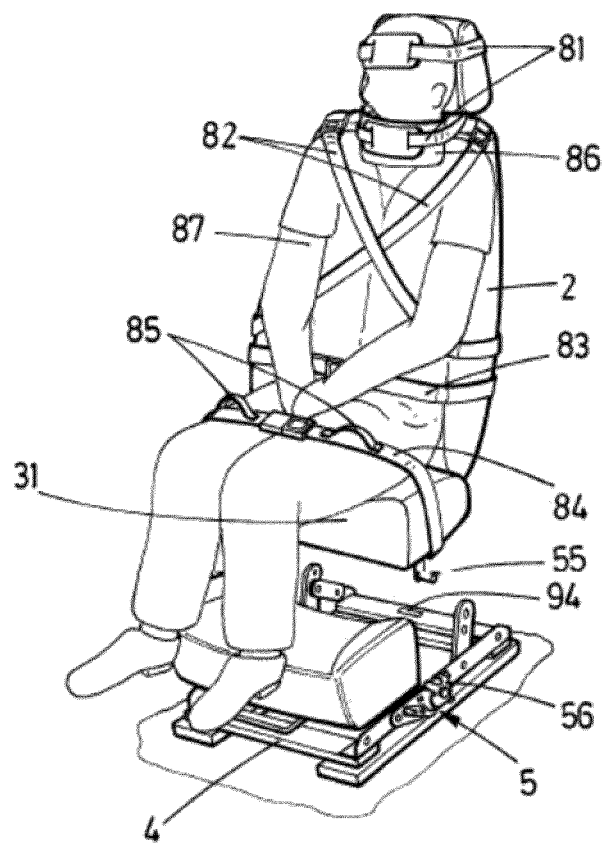
FIG. 2c shows the particular embodiment of FIG. 2a, after operating the emergency connecting means with a person sit on the seat assembly.

FIG. 2c shows the seat assembly of FIG. 2b with a person (87) sit on the seat assembly (1). This person (87) wears the straps (81, 82, 83, 84) and the cervical collar (86).

Figure 3A:
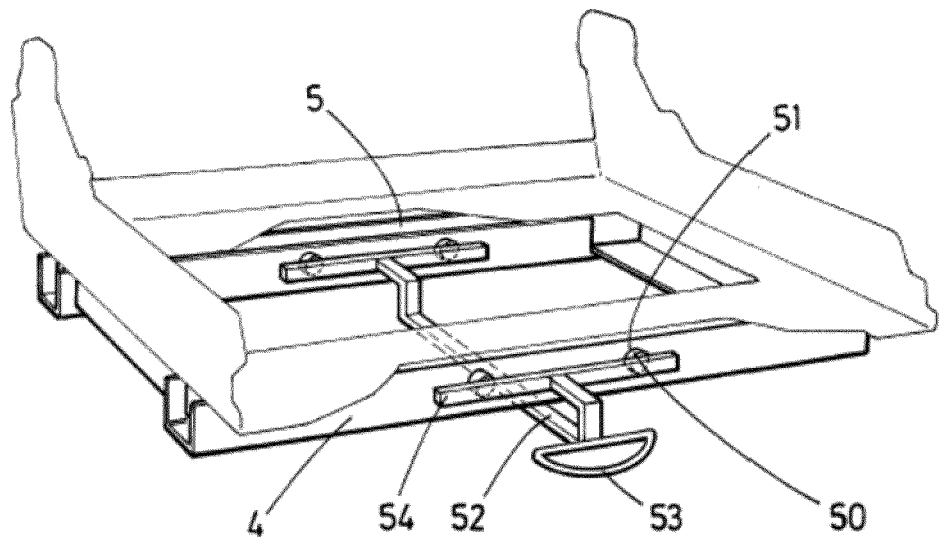
FIGS. 3a and 3b show a detail of emergency connecting means comprised in a particular embodiment of a dismountable seat assembly according to the disclosure.
Figure 3B:
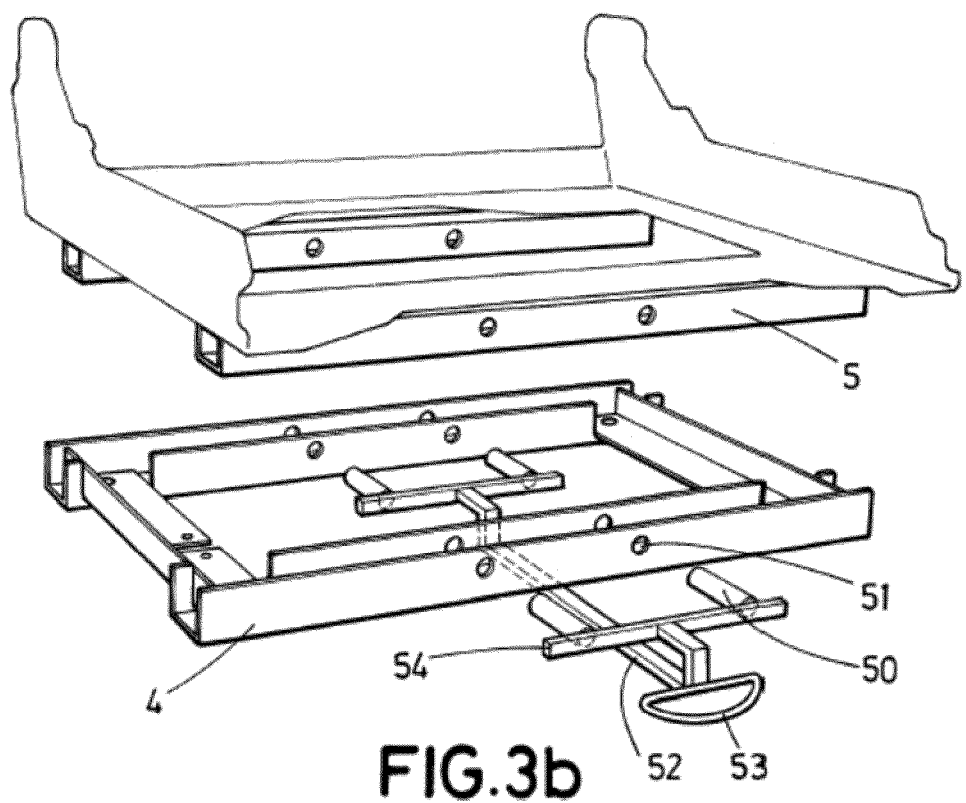

FIGS. 3a and 3b show a detail of the emergency connecting means (5) of a particular embodiment of a dismountable seat assembly (1) according to the disclosure. The individual seat is not shown in these figures, for the sake of clarity.

This particular embodiment comprise emergency connecting means (5) which in turn comprise a plurality of bolts (50), intended to be inserted in circular holes (51) comprised both in the attaching means (4) and in the individual seat (3) to attach the individual seat (3) to the attaching means (4).

These bolts (50) are interconnected by a connecting structure (52) comprising a handle (53), and rods (54) that connect the handle with the bolts (50).

In the event of an accident, the handle (53) is operated. The handle (53) moves the rods (54) and the rods (54) pull the bolts (50) outside the circular holes (51), so that the individual seat is releasable from the attaching means (4).

Figure 4A:
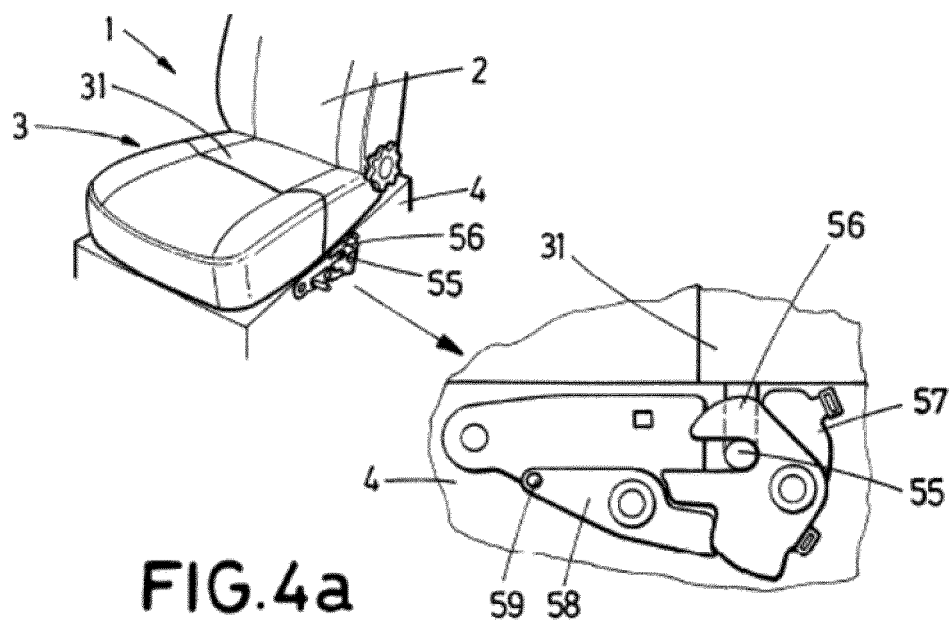
FIGS. 4a and 4b show a detail of different emergency connecting means comprised in a particular embodiment of a dismountable seat assembly according to the disclosure.
Figure 4B:
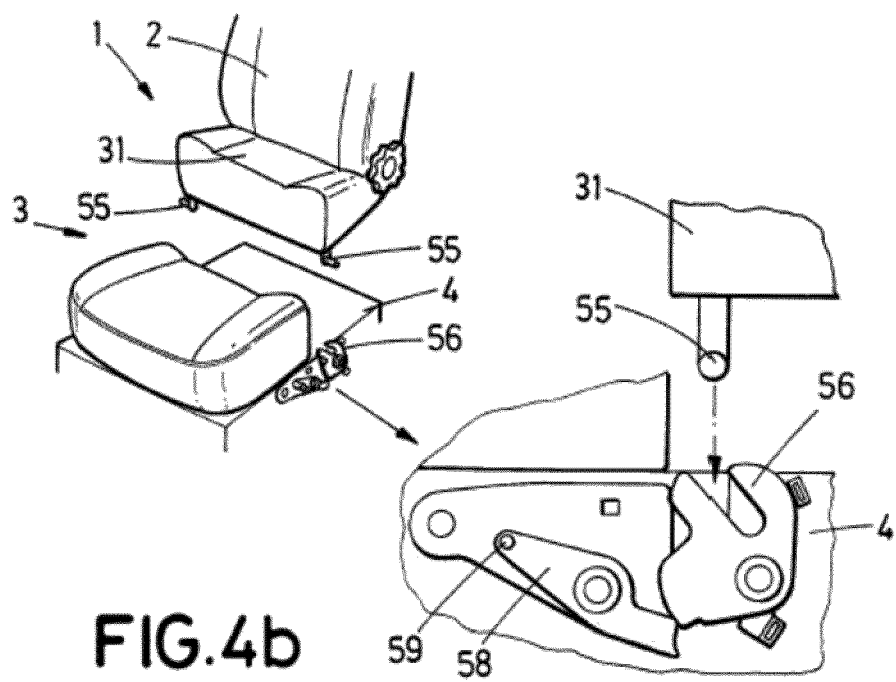

FIGS. 4a and 4b show a detail of the emergency connecting means (5) of another particular embodiment of a dismountable seat assembly according to the disclosure.

This particular embodiment comprise emergency connecting means (5) which in turn comprise a plurality of known fastening devices, each one being of the type of those comprising a bolt (55) intended to be introduced in a pivotable slot (56), the pivotable slot (56) being pivotally attached to a support piece (57). The support piece (57) also comprises a cam (58), so when the slot (56) rotates the cam (58) also rotates and traps the slot (56). A handle (59) is provided to retract the cam (58) so that the pivotable slot (56) is free to pivot and release the bolt (55).

In the event of an accident, the handle (59) is operated and the bolt (55) is released from the pivotable slot (56), so that the first part (31) of the individual seat (3) is released together with the individual back (2).

However, the different emergency connecting means described in this section are compatible with the different embodiments of dismountable seat assembly which are also described in this section. In different embodiments of the disclosure which are not disclosed in the figures, each seat assembly comprises different emergency connecting means, which work under the same principle of providing a way of dismounting the individual back and the part of the individual seat which is to be extracted in an easy and safe way, leaving the attaching means attached to the anchoring means of the vehicle.

FIG. 5a shows a car (100) which comprises a dismountable seat assembly (1) according to an embodiment of the disclosure.

FIG. 5b shows a bus (110) which comprises a dismountable seat assembly (1) according to an embodiment of the disclosure.

The disclosure is obviously not limited to the specific embodiments described herein, but also encompasses any variations that may be considered by any person skilled in the art (for example, as regards the choice of materials, dimensions, components, configuration, etc.).

The invention claimed is:

1. A dismountable seat assembly for being attached to anchoring means of a vehicle, the dismountable seat assembly comprising:
    an individual back and an individual seat, attached together;
    attaching means, configured to attach the dismountable seat assembly to the anchoring means of the vehicle; and
    emergency connecting means, connecting at least a part of the individual seat which is attached to the individual back to the attaching means in a detachable way, so that the individual back and the at least part of the individual seat attached to the individual back are detachable together from the attaching means,
        the emergency connecting means comprising a plurality of bolts, intended to be inserted in circular holes comprised both in the attaching means and in the individual seat to attach the individual seat to the attaching means, the bolts being interconnected by a connecting structure comprising a handle, and rods that connect the handle with the bolts.

2. The dismountable seat assembly according to claim 1, wherein the individual back and the individual seat are hingeably attached together with a hingeable attachment and the hingeable attachment comprises blocking means keeping constant the relative inclination between the individual seat and the individual back.

3. The dismountable seat assembly according to claim 1, wherein the at least part of the individual seat attached to the individual back is the whole individual seat.

4. The dismountable seat assembly according to claim 1, further comprising hiding means, arranged in the dismountable seat assembly covering the emergency connecting means in order to keep them hidden from accidental operation.

5. The dismountable seat assembly according to claim 1, further comprising a plurality of straps and a cervical collar for securing a person against the individual back and the at least part of the individual seat attached to the individual back.

6. An emergency system comprising a dismountable seat assembly according to claim 1 and a securing kit comprising a plurality of straps and a cervical collar for securing a person against the individual back and the at least part of the individual seat attached to the individual back.

7. The emergency system according to claim 6, wherein one point of each strap are attached together in a common point configured to provide an easy way of arranging the straps around the person, and at least two straps intended to secure the chest zone of the person are attached together in a predetermined way to be more easily installable around the chest zone of the person.

8. The emergency system according to claim 6, wherein at least one strap comprises a colours code, to be easily recognizable.

9. The emergency system according to claim 6, wherein at least one strap comprises secondary handling means.

10. A vehicle comprising a dismountable seat assembly according to claim 1.

* * * * *